US009361017B2

(12) United States Patent  
Huang (10) Patent No.: US 9,361,017 B2  
(45) Date of Patent: Jun. 7, 2016

(54) METHOD OF DISPLAYING INFORMATION BY CATEGORY AND ELECTRONIC DEVICE

(71) Applicant: LENOVO (BEIJING) LIMITED, Beijing (CN)

(72) Inventor: Xihuang Huang, Beijing (CN)

(73) Assignee: LENOVO (Beijing) Limited, Beijing (CN)

( * ) Notice: Subject to any disclaimer, the term of this patent is extended or adjusted under 35 U.S.C. 154(b) by 217 days.

(21) Appl. No.: 14/228,345

(22) Filed: Mar. 28, 2014

(65) Prior Publication Data

US 2015/0058767 A1 Feb. 26, 2015

(30) Foreign Application Priority Data

Aug. 26, 2013 (CN) .......................... 2013 1 0376400

(51) Int. Cl.
  *G06F 3/0488* (2013.01)
  *G06F 3/01* (2006.01)
  *G06F 3/0484* (2013.01)

(52) U.S. Cl.
  CPC .............. *G06F 3/0488* (2013.01); *G06F 3/016* (2013.01); *G06F 3/04842* (2013.01); *G06F 2203/014* (2013.01)

(58) Field of Classification Search
  CPC ....................................................... G06F 3/0488
  USPC ......................................................... 715/765
  See application file for complete search history.

(56) References Cited

U.S. PATENT DOCUMENTS

| | | | | |
|---|---|---|---|---|
| 5,694,616 A * | 12/1997 | Johnson | ............... | G06Q 10/107 709/207 |
| 7,865,836 B1 * | 1/2011 | Sperlongano | .......... | G06Q 10/08 701/454 |
| 8,254,970 B1 * | 8/2012 | Oshinsky | .............. | H04W 88/02 455/458 |
| 8,464,180 B1 * | 6/2013 | Kirkham | ........... | H04M 1/72586 715/765 |
| 8,930,827 B1 * | 1/2015 | Dumans | .................. | H04L 51/22 709/206 |
| 2008/0010603 A1 * | 1/2008 | Bennett | ............. | G06F 17/30663 715/765 |
| 2011/0195739 A1 * | 8/2011 | Deleus | .................... | H04W 4/00 455/518 |
| 2012/0240062 A1 * | 9/2012 | Passmore | .............. | H04L 12/588 715/758 |
| 2012/0303474 A1 * | 11/2012 | Sanel | ..................... | G06Q 30/08 705/26.4 |
| 2013/0167056 A1 * | 6/2013 | Basir | ..................... | G06F 3/0481 715/765 |
| 2013/0170348 A1 * | 7/2013 | Luna | ...................... | H04L 47/20 370/230.1 |
| 2013/0212170 A1 * | 8/2013 | Chung | .................. | G06Q 50/01 709/204 |
| 2014/0358799 A1 * | 12/2014 | Kingston | ............. | G06Q 30/016 705/304 |
| 2015/0054910 A1 * | 2/2015 | Offen | ................ | H04M 3/42059 348/14.02 |
| 2015/0058767 A1 * | 2/2015 | Huang | .................. | G06F 3/0488 715/765 |

* cited by examiner

*Primary Examiner* — Reza Nabi
(74) *Attorney, Agent, or Firm* — Kinney & Lange, P.A.

(57) ABSTRACT

The present invention discloses a method of displaying information by category and an electronic device. The method is applied in an electronic device including a touch display unit, the method comprising: obtaining M pieces of information to be processed, where M is an integer no less than 2; determining, based on a predetermined rule, that a display priority for N pieces of information of the M pieces of information to be processed is a first priority, and a display priority for K pieces of information of the M pieces of information to be processed is a second priority, the N pieces of information to be processed being different from the K pieces of information to be processed, where N is an integer no less than 0 but no more than M, K is an integer no less than 0 but no more than M, and a sum of N and K is no more than M; and displaying the N pieces of information to be processed and the K pieces of information to be processed on the touch display unit in different display ways.

8 Claims, 2 Drawing Sheets

METHOD OF DISPLAYING INFORMATION BY CATEGORY AND ELECTRONIC DEVICE

TECHNICAL FIELD

The present disclosure relates to the electronic techniques, and particularly, to a method of displaying information by category and an electronic device.

BACKGROUND

With continuous development of science and technology, electronic techniques have also been rapidly developed, and types of electronic products are becoming more and more. People also enjoy various conveniences brought by development of science and technology. Now, people may use various types of the electronic devices for enjoying a comfortable life brought by development of science and technology. For example, a user may watch movies, listen to music, play games etc. by the electronic device such as a tablet computer, a smart phone etc. The electronic device is widely used due to its inherent advantage of portability.

In the prior art, the electronic device, such as the smart phone, may be connected to a second electronic device via a traffic data network or a mobile Internet. When the second electronic device transmits information to the smart phone, the smart phone may display the information in a specific display area of the smart phone as an icon, prompting the user that new information is received, so that the user may perform subsequent processing conveniently.

For example, the smart phone may run a plurality of applications simultaneously, and the applications may connect to the Internet automatically. A server corresponding to the application may push dynamic information to the smart phone, or other communication device may transmit the dynamic information to the smart phone. The dynamic information may comprise: a system state prompt, a missed call, an unread SMS (Short Message Service), an email prompt, MicroBlog dynamic information, an application upgrade prompt etc. The dynamic information may be displayed on top of a screen of the smart phone as an icon. The top of the screen is an interface collectively presenting dynamic information. The user may view the dynamic information by a pull-down operation. When the user clicks an icon, it will turn to an interface of an application corresponding to the icon. For example, when the user clicks a missed-call icon, the smart phone may turn to a call history interface.

In the prior art, when the electronic device receives a plurality pieces of dynamic information, the electronic device may present the icons corresponding to the dynamic information in the specific area (e.g. the top of the display screen) of the electronic device only according to receiving times of the dynamic information.

The inventor of the present application found at least technical problems as follows during implementation of technical solutions according to embodiments of the present application.

In a practical use procedure, the electronic device may receive a plurality pieces of dynamic information. For example, when a version of an operating system in the smart phone is V1.0, while the version of the operating system is updated to V2.0, the server pushes system upgrade information "New version upgrade packs are detected. Download or not? Y/N"; when a MicroBlog application has been installed in the smart phone, and other MicroBlog users follow a MicroBlog account user in the smart phone, the smart phone may receive MicroBlog dynamic information "Two new fans. View or not?"; there also may be information such as the missed call "Zhang San" and the unread SMS "Li Si".

In the prior art, the dynamic information may be displayed in the specific area (e.g., the top of the screen) according to the receiving times. When the receiving time of important dynamic information is earlier and the user has not processed the dynamic information, the icons of the plurality pieces of unimportant dynamic information received later will occupy a display part of the specific area, even covering the icon of the important dynamic information received earlier, so that the icon of the important dynamic information cannot be displayed in the specific area. For example, the icon corresponding to the missed call or the icon corresponding to the unread SMS cannot be displayed intuitively in the specific area of the electronic device. Thus, the user cannot view the important dynamic information timely. Especially, when the dynamic information is a plurality of harassing phone calls or a plurality of spam SMSs, such types of information will occupy space of the specific area of the electronic device, so that dynamic information subsequently received cannot be displayed in the specific area.

In summary, there is a technical problem in the prior art, i.e., when the electronic device receives a plurality pieces of information, the received information cannot be displayed by category on the display unit, so that the user may miss the important information or cannot view the important information at first time.

SUMMARY OF INVENTION

Embodiments of the present application provide a method of displaying information by category and an electronic device, capable of solving the technical problem in the prior art, i.e., when the electronic device receives a plurality pieces of information, the received information cannot be displayed by category on the display unit, so that the user may miss the important information or cannot view the important information at first time.

In an aspect, an embodiment of the present application provides a method of displaying information by category, applied in an electronic device including a touch display unit, the method comprising: obtaining M pieces of information to be processed, where M is an integer no less than 2; determining, based on a predetermined rule, that a display priority for N pieces of information of the M pieces of information to be processed as a first priority, and a display priority for K pieces of information of the M pieces of information to be processed as a second priority, the N pieces of information to be processed being different from the K pieces of information to be processed, where N is an integer no less than 0 but no more than M, K is an integer no less than 0 but no more than M, and a sum of N and K is no more than M; and displaying the N pieces of information to be processed and the K pieces of information to be processed on the touch display unit in different display ways.

Alternatively, determining the first priority and the second priority based on the predetermined rule comprises: determining the first priority and the second priority, based on ranking information of information sources corresponding to the M pieces of information to be processed; or determining the first priority and the second priority, based on information on types to which the M pieces of information to be processed belong; or determining the first priority and the second priority, based on trigger frequency information for each type of the M pieces of information to be processed.

Alternatively, displaying the N pieces of information to be processed and the K pieces of information to be processed on the touch display unit in different display ways comprises: displaying the N pieces of information to be processed in a first display way corresponding to the first priority, and displaying the K pieces of information to be processed in a second display way corresponding to the second priority, the first display way being different from the second display way.

Alternatively, displaying the N pieces of information to be processed in the first display way corresponding to the first priority and displaying the K pieces of information to be processed in the second display way corresponding to the second priority comprises: displaying the N pieces of information to be processed in a first display area of the touch display unit, and displaying the K pieces of information to be processed in a second display area of the touch display unit, the first area being different from the second area.

Alternatively, displaying the N pieces of information to be processed in the first display way corresponding to the first priority and displaying the K pieces of information to be processed in the second display way corresponding to the second priority comprises: displaying the N pieces of information to be processed with a first display effect corresponding to the first display way, and displaying the K pieces of information to be processed with a second display effect corresponding to the second display way, the first display effect being different from the second display effect.

Alternatively, when the N pieces of information to be processed are displayed in the first display way corresponding to the first priority and the K pieces of information to be processed are displayed in the second display way corresponding to the second priority, the method further comprises: generating first prompt information while the N pieces of information to be processed are displayed in the first display way, and generating second prompt information while the K pieces of information to be processed are displayed in the second display way, the first prompt information being different from the second prompt information.

Alternatively, when it is determined that the display priority for the N pieces of information to be processed is the first priority, and the display priority for the K pieces of information to be processed is the second priority, the method further comprises: determining J pieces of information of M pieces of information to be processed, the J pieces of information to be processed being information not displayed on the touch display unit, where J is no less than 0 but no more than M, and a sum of N, K and J is less than M.

In another aspect, an embodiment of the present application provides an electronic device, comprising: a touch display unit; an obtaining unit, configured to obtain M pieces of information to be processed, where M is an integer no less than 2; a first processing unit, configured to determine, based on a predetermined rule, that a display priority for N pieces of information of the M pieces of information to be processed as a first priority, and a display priority for K pieces of information of the M pieces of information to be processed as a second priority, the N pieces of information to be processed being different from the K pieces of information to be processed, where N is an integer no less than 0 but no more than M, K is an integer no less than 0 but no more than M, and a sum of N and K is no more than M; and a second processing unit, configured to display the N pieces of information to be processed and the K pieces of information to be processed on the touch display unit in different display ways.

Alternatively, the first processing unit is further configured to determine the first priority and the second priority, based on ranking information of information sources corresponding to the M pieces of information to be processed; or to determine the first priority and the second priority, based on information on types to which the M pieces of information to be processed belong; or to determine the first priority and the second priority, based on trigger frequency information for each type of the M pieces of information to be processed.

Alternatively, the second processing unit is further configured to display the N pieces of information to be processed in a first display way corresponding to the first priority, and display the K pieces of information to be processed in a second display way corresponding to the second priority, the first display way being different from the second display way.

Alternatively, the second processing unit is further configured to display the N pieces of information to be processed in a first display area of the touch display unit, and display the K pieces of information to be processed in a second display area of the touch display unit, the first area being different from the second area.

Alternatively, the second processing unit is further configured to display the N pieces of information to be processed with a first display effect corresponding to the first display way, and display the K pieces of information to be processed with a second display effect corresponding to the second display way, the first display effect being different from the second display effect.

Alternatively, the second processing unit is further configured to generate first prompt information while the N pieces of information to be processed are displayed in the first display way, and generate second prompt information while the K pieces of information to be processed are displayed in the second display way, the first prompt information being different from the second prompt information.

Alternatively, the first processing unit is further configured to determine J pieces of information of M pieces of information to be processed, the J pieces of information to be processed being information that will not be displayed on the touch display unit, where J is no less than 0 but no more than M, and a sum of N, K and J is less than M.

One or more technical solutions provided in the embodiments of the present application have at least technical effects or advantages as follows.

1. According to the technical solution of categorizing the information to be processed and displaying the N pieces of information to be processed and the K pieces of information to be processed on the touch display unit in different display ways, by displaying information with different display priorities on the touch display unit in the different ways, the user may intuitively know importance degrees of the information according to the display ways of the information. Thus, no important information may be missed, or the important information can be viewed at first time. Therefore, the technical problem in the prior art, i.e., the received information cannot be displayed by category on the display unit when the electronic device receives a plurality pieces of information, so that the user may miss the important information or cannot view the important information at first time, may be solved. And a technical effect of prompting the important information to the user accurately may be achieved.

2. According to the technical solution of generating the first prompt information prompting to the user that there are N pieces of information to be processed with the first priority in the M pieces of information to be processed when the N pieces of information to be processed are displayed in the first display way; and generating the second prompt information prompting to the user that there are K pieces of information to be processed with the second priority in the M pieces of information to be processed when the K pieces of information to be processed are displayed in the second display way, a technical effect of prompting the important information to the user more accurately may be achieved.

DETAILED DESCRIPTION

Embodiments of the present application provide a method of displaying information by category and an electronic device, capable of solving the technical problem in the prior art, i.e., when the electronic device receives a plurality pieces of information, the received information cannot be displayed by category on the display unit, so that the user may miss the important information or cannot view the important information at first time.

A general concept of technical solutions in the embodiments of the present application for solving the above technical problem may be illustrated as follows.

An embodiment of the present application provides a method of displaying information by category, applied in an electronic device including a touch display unit. The method may comprise:

firstly, obtaining M pieces of information to be processed, where M is an integer no less than 2; for example, taking the smart phone as an example, ten pieces of information to be processed may be obtained, in which there are two pieces of missed call information, two pieces of unread SMS information, three pieces of software upgrade information and three pieces of software push information;

then, determining, based on a predetermined rule, that a display priority for N pieces of information of the M pieces of information to be processed as a first priority, and a display priority for K pieces of information of the M pieces of information to be processed as a second priority, the N pieces of information to be processed being different from the K pieces of information to be processed, where N is an integer no less than 0 but no more than M, K is an integer no less than 0 but no more than M, and a sum of N and K is no more than M; for example, it may be determined that the display priority of the two pieces of missed call information and two pieces of unread SMS information is the first priority, the display priority of the three software upgrade information is the second priority, and the display priority of the three pieces of software push information is the third priority;

finally, displaying the N pieces of information to be processed and the K pieces of information to be processed on the touch display unit in different display ways; for example, the two pieces of missed call information and the two pieces of unread SMS information belonging to the first priority may be displayed on the touch display unit in the first display way, and the three pieces of software upgrade information belonging to the second priority may be displayed on the touch display unit in the second display way.

As can be seen from the above, according to the technical solution of categorizing the information to be processed and displaying the N pieces of information to be processed and the K pieces of information to be processed on the touch display unit in different display ways is utilized, by displaying information with different display priorities on the touch display unit in the different ways, the user may intuitively know importance degrees of the information according to the display ways of the information. Thus, no important information may be missed, or the important information can be viewed at first time. Therefore, the technical problem in the prior art, i.e., the received information cannot be displayed by category on the display unit when the electronic device receives a plurality pieces of information, so that the user may miss the important information or cannot view the important information at first time, may be solved. And a technical effect of prompting the important information to the user accurately may be achieved.

Hereinafter, the above technical solutions will be described in detail in connection with the drawings and particular embodiments, in order to better understand the above technical solutions.

An embodiment of the present application provides a method of displaying information by category, applied in an electronic device including a touch display unit. In practical applications, the electronic device may be a smart phone, and may also be a tablet computer, which are not limited here. In the following parts, the smart phone will be taken as an example of the electronic device for illustration in detail.

Figure 1:
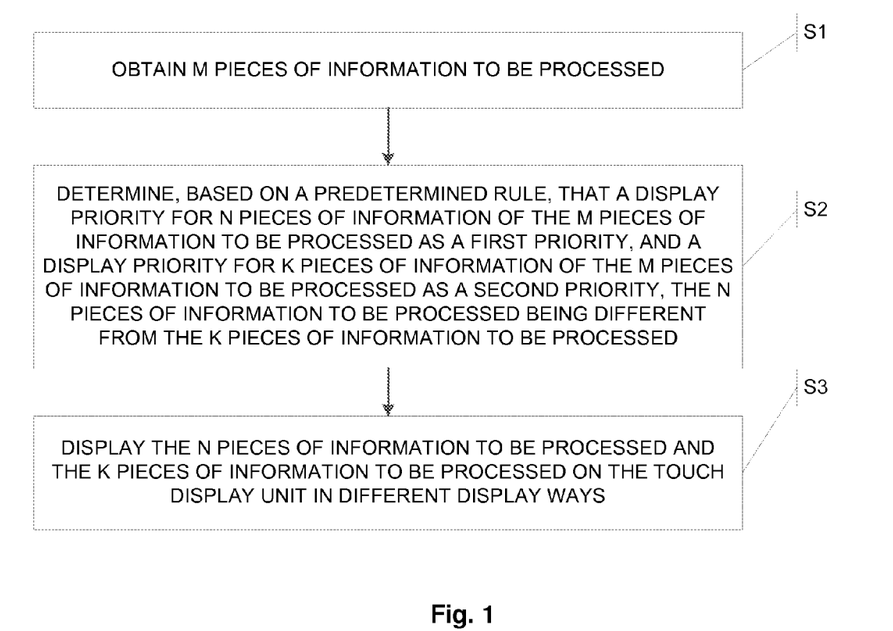
FIG. 1 shows a flowchart of a method of displaying information by category in an embodiment of the present application.

Referring to FIG. 1, FIG. 1 is a flowchart of a method of displaying information by category in an embodiment of the present application. As shown in FIG. 1, the method may comprise:

Step S1 of obtaining M pieces of information to be processed, where M is an integer no less than 2;

Step S2 of determining, based on a predetermined rule, that a display priority for N pieces of information of the M pieces of information to be processed as a first priority, and a display priority for K pieces of information of the M pieces of information to be processed as a second priority, the N pieces of information to be processed being different from the K pieces of information to be processed, where N is an integer no less than 0 but no more than M, K is an integer no less than 0 but no more than M, and a sum of N and K is no more than M; and Step S3 of displaying the N pieces of information to be processed and the K pieces of information to be processed on the touch display unit in different display ways.

In step S1, the M pieces of information to be processed may be obtained. In particular, in the process of using the smart phone, the M pieces of information to be processed may be obtained at a first time point such as 9:00, or a total of M pieces of information to be processed may be obtained between the first time point such as 9:00 and a second time point such as 10:00. The present disclosure does not make any limitation on this point here.

For example, let M be ten. The smart phone obtains ten pieces of information to be processed at the time point 9:00, in which there are two pieces of missed call information, two pieces of unread SMS information, three pieces of software upgrade information, and three pieces of software push information. Here, the ten pieces of information to be processed may be categorized and displayed by the method of displaying information by category according to the embodiment of the present application.

In another case, if the smart phone obtains eight pieces of information to be processed in a period of time of 9:00-9:50, the eight pieces of information to be processed may be categorized and displayed by the method of displaying information by category according to the embodiment of the present application. Then, the smart phone may obtain two pieces of information to be processed at the time point 10:00. Here, all of the ten pieces of information to be processed may be re-categorized and displayed by the method of displaying information by category according to the embodiment of the present application. Or, the two pieces of information to be processed which are obtained at 10:00 may be categorized, and then the categorized information may be added to the processing result of the former eight pieces according to the display priority. The present disclosure does not make any limitation on this point here.

In step S2, it may be determined based on a predetermined rule that the display priority for N pieces of information of the M pieces of information to be processed is the first priority, and the display priority for K pieces of information of the M pieces of information to be processed is the second priority. In particular, there may be three situations. The first situation is to determine that the display priority for N pieces of information of the M pieces of information to be processed is the first priority and the display priority for K pieces of information of the M pieces of information to be processed is the second priority, based on ranking information of information sources corresponding to the M pieces of information to be processed. The second situation is to determine the display priority for N pieces of information of the M pieces of information to be processed is the first priority, and the display priority for K pieces of information of the M pieces of information to be processed is the second priority, based on information on types to which the M pieces of information to be processed belong. The third situation is to determine the display priority for N pieces of information of the M pieces of information to be processed is the first priority, and the display priority for K pieces of information of the M pieces of information to be processed is the second priority, based on trigger frequency information for each type of the M pieces of information to be processed. Hereinafter, it will be described how to determine the display priority for N pieces of information of the M pieces of information to be processed as the first priority and to determine the display priority for K pieces of information of the M pieces of information to be processed as the second priority in the three situations, respectively.

First Situation

A communication unit in the smart phone may record the missed call information and the unread SMS information of the local device. The information source of the missed call information and the unread SMS information is another electronic device which can dial a number of the local device or send a SMS to the local device, e.g., another smart phone or tablet computer; the software upgrade information may be a software information version on a server and a software information version of the local device which are detected by the server. In this case, the information source of the software upgrade information may be the server transmitting upgrade information to the local device. Or, the software upgrade information may be generated according to the software information version of the local device and the software information version on the server. In this case, the information source of the software upgrade information may be the smart phone itself. The information source of the software push information may be a provider or operator of the software, e.g., the push information of MicroBlog may be transmitted to the smart phone by a server operating MicroBlog. The description thereof will be omitted here.

In practical applications, information on ranking the information sources of respective messages may be stored in a first preset list in the electronic device. For example, taking the several information sources as mentioned previously as examples, the electronic device capable of dialing the local device or sending SMSs to the local device may be set as the first priority; the sever for transmitting the software upgrade information may be set as the second priority; and the information source of the software push information may be set as the third priority etc., which will not be listed one by one here.

The ranking information for ranking these information sources may be stored in the first preset list, i.e., it may be determined according to the first preset list that the display priority of the N pieces of information to be processed is the first priority and the display priority of the K pieces of information to be processed is the second priority.

For example, in the present embodiment, there are two pieces of missed call information and two pieces of unread SMS information in the ten pieces of information to be processed. It may be determined according to the first preset list that the information source of the four pieces of information is the information source of the first priority, so that the display priority of the four pieces of information may be determined to be the first priority. There are three software upgrade information in the ten pieces of information to be processed. Thus, it may be determined according to the first preset list that the information source of the three pieces of information is the information source of the second priority, so that the display priority of the three pieces of information may be determined to be the second priority. The description thereof will be omitted here.

Of course, in practical applications, the ranking of the information sources may be a default ranking criteria, e.g., a fixed ranking criteria set according to customs, preferences of most of the users, and may also be a specific ranking criteria set for the user according to personal customs of the user. The description thereof will be omitted here.

Second Situation

The M pieces of information to be processed may have different information types. For example, there are ten pieces of information to be processed as described previously. The ten pieces of information to be processed may be classified as a missed call information type, an unread SMS information type, a software upgraded information type, and a software push information type etc.

Next, the above information types may be ranked. For example, the missed call information type and the unread SMS information type may be the first priority, the software upgraded information type and the software push information type may be the second priority. Then, the ten pieces of information to be processed may be ranked according to the ranking of the information types, so as to determine that the display priority of the two pieces of missed call information and two pieces of unread SMS information in the ten pieces of information to be processed is the first priority, and the display priority of the three pieces of software upgraded information and three pieces of software push information is the second priority. The description thereof will be omitted here.

Of course, the ranking of the information types may be a default ranking criteria, and may also be a specific ranking criteria set for the user according to personal customs of the user, e.g., if the user considers that the software push information is more important, the priority of the software push information type may be defined as the first priority. The description thereof will be omitted here.

Third Situation

The M pieces of information to be processed may be generated by the electronic device in response to some trigger condition being satisfied. For example, if another electronic device dials the number of the local smart phone but the local device is not reachable, the local device may be triggered to generate the missed call information; if another electronic device sends an SMS to the local smart phone but the local device has not yet displayed the SMS according to a viewing instruction of the user, the local device may be triggered to generate the unread SMS information. The description thereof will be omitted here.

If some type of information has a higher trigger frequency, e.g., being triggered several times within a week or a day, e.g., the trigger frequency of the unread SMS information in the M pieces of information to be processed is higher (assuming being beyond a preset threshold), if the trigger times of the unread SMS within a day is 50 and the preset threshold is 20 times per day, it means that the user generally communicates with others by SMSs. Here, the display priority of the unread SMS information may be set as the first priority, so as to prompt the important information to the user accurately. Thus, the user will not miss the unread SMS information, or can process the unread SMS information at first time. For another example, the software push information within a day is three times, and the preset threshold is 20 times per day. Here, the display priority of the software push information may be set as the second priority. The description thereof will be omitted here.

In practical applications, a specific value of the preset threshold may be set by the user so as to meet the requirement of the user. The description thereof will be omitted here.

The three situations as described above respectively introduce the particular processes of determining the display priority for N pieces of information of the M pieces of information to be processed as the first priority and the display priority for K pieces of information of the M pieces of information to be processed as the second priority according to the ranking information of the information sources corresponding to the information to be processed, the information on types to which the information to be processed belong and trigger frequency information for each type of the information to be processed. In a specific implementation, a specific method of categorizing the priorities may be set by the user himself according to actual situations. For example, the user may set the information source corresponding to some chatting software to be the first priority, set the missed call and the unread SMS to be the second priority, and set the information whose trigger frequency is beyond a preset threshold to be the third priority etc. so that the information displayed by category on the electronic device may be displayed according to the requirements of the user, and thus the technical effect of accurately prompting the important information to the user may be achieved. The description thereof will be omitted here.

Of course, in a specific implementation, when it is determined that the display priority for the N pieces of information to be processed is the first priority and the display priority for the K pieces of information to be processed is the second priority, the method of displaying information by category according to the present embodiment may further comprise: determining J pieces of information of M pieces of information to be processed, the J pieces of information to be processed being information not displayed on the touch display unit.

For example, there are ten pieces of information to be processed as described previously. One of the two pieces of missed call information is dialed from a first number in a "blacklist" of the smart phone, and one of the two SMSs is sent from a second number in the "blacklist" of the smart phone. Thus, two pieces of information to be processed which are not be displayed may be determined from the M pieces of information to be processed according to the blacklist, i.e., a second preset list. Of course, besides the telephone numbers, some software, e.g., some advertisement software that the user does not want, may also be recorded in the blacklist. As such, the information to be processed corresponding to these advertisement software may also be determined as the information not displayed. The description thereof will be omitted here. Therefore, some information that the user does not want to see may be shielded, so as to reduce a possibility of unimportant information occupying the display position of the important information, which may prompt the important information to the user more accurately.

The previous parts introduce several situations in step S2 of determining the display priority for the N pieces of information to be processed as the first priority and the display priority for the K pieces of information to be processed as the second priority. In practical implementations, the skilled in the art may select one of the approaches used in the three situations, or several of the approaches in combination, so as to satisfy the requirements of the actual situations. The description thereof will be omitted here.

After determining the display priority for the N pieces of information to be processed is the first priority and the display priority for the K pieces of information to be processed is the second priority in step S2, the information processing method according to the embodiment of the present application proceeds to step S3, i.e., displaying the N pieces of information to be processed and the K pieces of information to be processed on the touch display unit in different display ways.

In particular, the N pieces of information to be processed may be displayed in a first display way corresponding to the first priority, and the K pieces of information to be processed may be displayed in a second display way corresponding to the second priority, the first display way being different from the second display way.

In a specific implementation, the N pieces of information to be processed may be displayed in the first display area of the touch display screen on the smart phone, e.g., an upper part of the touch display screen; and the K pieces of information to be processed may be displayed in the second display area of the touch display screen on the smart phone, e.g., an lower part of the touch display screen. Since the user generally view the smart phone from top to bottom, by displaying the N pieces of information to be processed in the upper part of the touch display screen and the K pieces of information to be processed in the lower part of the touch display screen by the method of displaying information by category according to the embodiment of the present application, the user may naturally follow his custom to process the N pieces of information to be processed of the first priority firstly, and then process the K pieces of information to be processed of the second priority. Therefore, the technical problem in the prior art, i.e., the received information cannot be displayed by category on the display unit when the electronic device receives a plurality pieces of information, so that the user may miss the important information or cannot view the important information at first time, may be solved. And the technical effect of prompting the important information to the user accurately may be achieved.

Of course, besides displaying the N pieces of information to be processed and the K pieces of information to be processed in different display areas, the N pieces of information to be processed and the K pieces of information to be processed may also be displayed in different display effects.

For example, a background color of the N pieces of information to be processed is set as red, a background color of the K pieces of information to be processed is set as blue; or a font size of the N pieces of information to be processed is set as a larger size, and a font size of the K pieces of information to be processed is set as a smaller size; or a font of the N pieces of information to be processed is adjusted to be a striking art word, and the K pieces of information to be processed is adjusted to be a normal Song typeface word or Kai typeface word. The description thereof will be omitted here. As such, by displaying the N pieces of information to be processed and the K pieces of information to be processed in different display effects, the user may determine the N pieces of information to be processed of the first priority and the K pieces of information to be processed of the second priority according to strong or weak attraction of the display effects, and thus may firstly process the N pieces of information to be processed of the first priority, and then process the K pieces of information to be processed of the second priority. Therefore, the technical problem in the prior art, i.e., the received information cannot be displayed by category on the display unit when the electronic device receives a plurality pieces of information, so that the user may miss the important information or cannot view the important information at first time, may be solved. And the technical effect of prompting the important information to the user accurately may be achieved.

In order to prompt the important information to the user more accurately, when the N pieces of information to be processed are displayed in the first display way corresponding to the first priority and the K pieces of information to be processed are displayed in the second display way corresponding to the second priority, the method of displaying information by category according to the embodiment of the present invention may further comprise:

generating first prompt information while the N pieces of information to be processed are displayed in the first display way, and generating second prompt information while the K pieces of information to be processed are displayed in the second display way.

The first prompt information and the second prompt information may be information including prompt approaches such as vibration, sound and lighting effect etc. However, since the first prompt information is prompt information prompting to the user that the N pieces of information to be processed is in the first priority, and the second prompt information is prompt information prompting to the user that the K pieces of information to be processed is in the second priority, the prompt approach of the first prompt information may be set as an approach that may attract the user more, while the prompt approach of the second prompt information may be set as a general approach, so that the user may determine the important information and less important information N pieces of information of the M pieces of information to be processed according to the first prompt information and the second prompt information.

For example, the first prompt information may be prompt information including three prompt approaches of vibration, sound and lighting effect simultaneously. That is, when the N pieces of information to be processed of the first priority exist in the M pieces of information to be processed, the smart phone may generate the first prompt information, so as to control the smart phone to vibrate, to output sound via an audio output apparatus such as a speaker, and to output the lighting effect by the screen or a LED light. However, the second prompt information may include only vibration, so that when the K pieces of information to be processed of the second priority exist in the M pieces of information to be processed, the smart phone may generate the second prompt information, so as to control the smart phone to vibrate.

In this case, when the user finds that the smart phone vibrates, sounds and outputs the lighting effect simultaneously, he can know that there is important information in the smart phone, so that he may process the important information at first time. However, when the user finds that the smart phone only vibrates, he can know that there is less important information in the smart phone, so that he may select to process immediately or later when he is available according to the actual situations. Therefore, the technical effect of prompting the important information to the user more accurately may be achieved.

Of course, in practical applications, the prompt information may also be a piece of information including one prompt approach. For example, the first prompt information may be vibration with a longer duration (e.g. 2 minutes), and the second prompt information may be vibration with a shorter duration (e.g. 10 s); or the first prompt information may be prompt information with a higher sound decibel value, and the second prompt information may be prompt information with a lower sound decibel value. As such, the user may know the important information and the less important information in the M pieces of information to be processed according to the durations of the vibration or the sound decibel values. Therefore, the technical effect of prompting the important information to the user accurately may also be achieved. The description thereof will be omitted here.

As seen from the above, according to the technical solution of categorizing the information to be processed and displaying the N pieces of information to be processed and the K pieces of information to be processed on the touch display unit in different display ways, by displaying information with different display priorities on the touch display unit in the different ways, the user may intuitively know importance degrees of the information according to the display ways of the information. Thus, no important information may be missed, or the important information can be viewed at first time. Therefore, the technical problem in the prior art, i.e., the received information cannot be displayed by category on the display unit when the electronic device receives a plurality pieces of information, so that the user may miss the important information or cannot view the important information at first time, may be solved. And the technical effect of prompting the important information to the user accurately may be achieved.

Further, according to the technical solution of generating the first prompt information prompting to the user that there are N pieces of information to be processed with the first priority in the M pieces of information to be processed when the N pieces of information to be processed are displayed in the first display way; and generating the second prompt information prompting to the user that there are K pieces of information to be processed with the second priority in the M pieces of information to be processed when the K pieces of information to be processed are displayed in the second display way is utilized, the technical effect of prompting the important information to the user more accurately may be achieved.

Based on the same inventive concept, an embodiment of the present application provides an electronic device. In practical applications, the electronic device may be the smart phone or the tablet computer. The present disclosure does not make any limitation on this point here.

Figure 2:
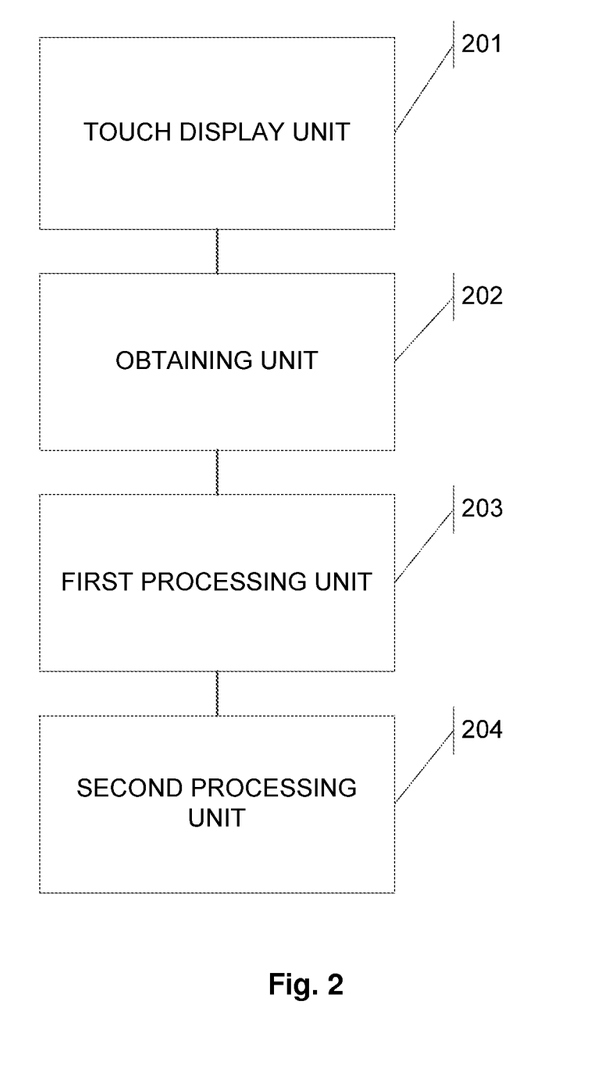
FIG. 2 shows a structure diagram of an electronic device in an embodiment of the present application.

Referring to FIG. 2, FIG. 2 shows a structure diagram of an electronic device in an embodiment of the present application. As shown in FIG. 2, the electronic device may comprise:

a touch display unit 201;

an obtaining unit 202, configured to obtain M pieces of information to be processed, where M is an integer no less than 2;

a first processing unit 203, configured to determine, based on a predetermined rule, that a display priority for N pieces of information of the M pieces of information to be processed as a first priority, and a display priority for K pieces of information of the M pieces of information to be processed as a second priority, the N pieces of information to be processed being different from the K pieces of information to be processed, where N is an integer no less than 0 but no more than M, K is an integer no less than 0 but no more than M, and a sum of N and K is no more than M; and a second processing unit 204, configured to display the N pieces of information to be processed and the K pieces of information to be processed on the touch display unit in different display ways.

In a specific implementation, the first processing unit 203 may be further configured to determine the first priority and the second priority, based on ranking information of information sources corresponding to the M pieces of information to be processed; or to determine the first priority and the second priority, based on information on types to which the M pieces of information to be processed belong; or to determine the first priority and the second priority, based on trigger frequency information for each type of the M pieces of information to be processed.

In a specific implementation, the second processing unit 204 may be further configured to display the N pieces of information to be processed in a first display way corresponding to the first priority, and display the K pieces of information to be processed in a second display way corresponding to the second priority, the first display way being different from the second display way.

In a specific implementation, the second processing unit 204 may be further configured to display the N pieces of information to be processed in a first display area of the touch display unit, and display the K pieces of information to be processed in a second display area of the touch display unit, the first area being different from the second area.

In a specific implementation, the second processing unit 204 may be further configured to display the N pieces of information to be processed with a first display effect corresponding to the first display way, and display the K pieces of information to be processed with a second display effect corresponding to the second display way, the first display effect being different from the second display effect.

In a specific implementation, the second processing unit 204 may be further configured to generate first prompt information while the N pieces of information to be processed are displayed in the first display way, and generate second prompt information while the K pieces of information to be processed are displayed in the second display way, the first prompt information being different from the second prompt information.

In a specific implementation, the first processing unit 203 may be further configured to determine, by a second preset list, J of the M pieces of information to be processed which will not be displayed on the touch display unit 201, where J is no less than 0 but no more than M, and a sum of N, K and J is less than M.

The electronic device in the present embodiment and the method of displaying information by category in the previous embodiment belong to two aspects of one and the same concept. The implementation of the method has been previously described in detail. Thus, the skilled in the art may clearly understand the structure and the implementation of the electronic device in the present embodiment according to the previous description. Therefore, the detailed description on the electronic device will be omitted here for conciseness of the specification.

One or more technical solutions provided in the embodiments of the present application have at least technical effects or advantages as follows.

1. According to the technical solution of categorizing the information to be processed and displaying the N pieces of information to be processed and the K pieces of information to be processed on the touch display unit in different display ways, by displaying information with different display priorities on the touch display unit in the different ways, the user may intuitively know importance degrees of the information according to the display ways of the information. Thus, no important information may be missed, or the important information can be viewed at first time. Therefore, the technical problem in the prior art, i.e., the received information cannot be displayed by category on the display unit when the electronic device receives a plurality pieces of information, so that the user may miss the important information or cannot view the important information at first time, may be solved. And a technical effect of prompting the important information to the user accurately may be achieved.

2. According to the technical solution of generating the first prompt information prompting to the user that there are N pieces of information to be processed with the first priority in the M pieces of information to be processed when the N pieces of information to be processed are displayed in the first display way; and generating the second prompt information prompting to the user that there are K pieces of information to be processed with the second priority in the M pieces of information to be processed when the K pieces of information to be processed are displayed in the second display way, the technical effect of prompting the important information to the user more accurately may be achieved.

It can be appreciated by those skilled in the art that the embodiments of the present invention can be implemented as a method, a system or a computer program product. The present invention may include pure hardware embodiments, pure software embodiments and any combination thereof. Also, the present invention may include a computer program product implemented on one or more computer readable storage medium (including, but not limited to, magnetic disk storage, optical storage) containing computer readable program codes.

The present invention have been described with reference to the flowcharts and/or block diagrams of the method, device (system) and computer program product according to the embodiments of the present invention. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by the computer or the processor of any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute an article of manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

Although preferred embodiments of the present invention have been described, the skilled in the art may make additional variations and modifications on these embodiments once he knows the basic inventive concept. Therefore, the appended claims intend to be explained as including the preferred embodiments and all of variations and modifications falling into the scope of the present invention.

Obviously, various modifications and variants can be made to the present invention by those skilled in the art without departing from the spirit and scope of the present invention. Therefore, these modifications and variants are to be encompassed by the present invention if they fall within the scope of the present invention as defined by the claims and their equivalents.

I claim:

1. A method of displaying information by category, applied in an electronic device including a touch display unit and a processor, the method comprising:

obtaining, by the electronic device, M pieces of information to be viewed by a user, where M is an integer no less than 2;

automatically determining, by the processor, based on a predetermined rule, that a display priority for N pieces of information of the M pieces of information to be viewed as a first priority, and a display priority for K pieces of information of the M pieces of information to be viewed as a second priority, the N pieces of information to be viewed being different from the K pieces of information to be viewed, where N is an integer no less than 0 but no more than M, K is an integer no less than 0 but no more than M, and a sum of N and K is no more than M; and automatically displaying, by the processor, the N pieces of information to be viewed and the K pieces of information to be viewed on the touch display unit in different display ways based on the determined respective display priorities;

wherein determining the first priority and the second priority based on the predetermined rule comprises:

determining the first priority and the second priority based on ranking information of information sources corresponding to the M pieces of information to be viewed; or determining the first priority and the second priority based on information on types to which the M pieces of information to be viewed belong; or determining the first priority and the second priority based on trigger frequency information for each type of the M pieces of information to be viewed;

wherein displaying the N pieces of information to be viewed and the K pieces of information to be viewed on the touch display unit in different display ways comprises:

displaying the N pieces of information to be viewed in a first display way corresponding to the first priority, and displaying the K pieces of information to be viewed in a second display way corresponding to the second priority, the first display way being different from the second display way; and wherein when the N pieces of information to be viewed are displayed in the first display way corresponding to the first priority and the K pieces of information to be viewed are displayed in the second display way corresponding to the second priority, generating first prompt information while the N pieces of information to be viewed are displayed in the first display way, and generating second prompt information while the K pieces of information to be viewed are displayed in the second display way, the first prompt information being different from the second prompt information, wherein the first prompt information and the second prompt information are selected from three prompt approaches of vibration, sound and lighting effect.

2. The method according to claim 1, wherein displaying the N pieces of information to be viewed in the first display way corresponding to the first priority and displaying the K pieces of information to be viewed in the second display way corresponding to the second priority comprises:

displaying the N pieces of information to be viewed in a first display area of the touch display unit, and displaying the K pieces of information to be-viewed in a second display area of the touch display unit, the first area being different from the second area.

3. The method according to claim 1, wherein displaying the N pieces of information to be viewed in the first display way corresponding to the first priority and displaying the K pieces of information to be viewed in the second display way corresponding to the second priority comprises:

displaying the N pieces of information to be viewed with a first display effect corresponding to the first display way, and displaying the K pieces of information to be viewed with a second display effect corresponding to the second display way, the first display effect being different from the second display effect.

4. The method according to claim 1, further comprising, when it is determined that the display priority for the N pieces of information to be viewed is the first priority, and the display priority for the K pieces of information to be viewed is the second priority:

determining J pieces of information of M pieces of information to be viewed, the J pieces of information to be viewed being information that will not be displayed on the touch display unit, where J is no less than 0 but no more than M, and a sum of N, K and J is less than M.

5. An electronic device, comprising:

a touch display unit;

an obtaining unit, configured to obtain M pieces of information to be viewed by a user, where M is an integer no less than 2;

a processor, configured to:

automatically determine, based on a predetermined rule, that a display priority for N pieces of information of the M pieces of information to be viewed as a first priority, and a display priority for K pieces of information of the M pieces of information to be viewed as a second priority, the N pieces of information to be viewed being different from the K pieces of information to be viewed, where N is an integer no less than 0 but no more than M, K is an integer no less than 0 but no more than M, and a sum of N and K is no more than M; and automatically display the N pieces of information to be viewed and the K pieces of information to be viewed on the touch display unit in different display ways based on the determined respective display priorities;

wherein automatically determining the first priority and the second priority based on the predetermined rule comprises:

determining the first priority and the second priority based on ranking information of information sources corresponding to the M pieces of information to be viewed; or determining the first priority and the second priority based on information on types to which the M pieces of information to be viewed belong; or determining the first priority and the second priority based on trigger frequency information for each type of the M pieces of information to be viewed;

wherein automatically displaying the N pieces of information to be viewed and the K pieces of information to be viewed on the touch display unit in different display ways comprises:

displaying the N pieces of information to be viewed in a first display way corresponding to the first priority, and displaying the K pieces of information to be viewed in a second display way corresponding to the second priority, the first display way being different from the second display way; and wherein when the N pieces of information to be viewed are displayed in the first display way corresponding to the first priority and the K pieces of information to be viewed are displayed in the second display way corresponding to the second priority, generating first prompt information while the N pieces of information to be viewed are displayed in the first display way, and generating second prompt information while the K pieces of information to be viewed are displayed in the second display way, the first prompt information being different from the second prompt information, wherein the first prompt information and the second prompt information are selected from three prompt approaches of vibration, sound and lighting effect.

6. The electronic device according to claim 5, wherein the processor is further configured to display the N pieces of information to be viewed in a first display area of the touch display unit, and display the K pieces of information to be viewed in a second display area of the touch display unit, the first area being different from the second area.

7. The electronic device according to claim 5, wherein the processor is further configured to display the N pieces of information to be viewed with a first display effect corresponding to the first display way, and display the K pieces of information to be viewed with a second display effect corresponding to the second display way, the first display effect being different from the second display effect.

8. The electronic device according to claim 5, wherein the processor is further configured to determine J pieces of information to be viewed of the M pieces of information to be viewed, the J pieces of information to be viewed being information that will not be displayed on the touch display unit, where J is no less than 0 but no more than M, and a sum of N, K and J is less than M.

* * * * *